United States Patent
Bowser

(10) Patent No.: US 6,299,777 B1
(45) Date of Patent: Oct. 9, 2001

(54) OSMOTIC DISTILLATION PROCESS

(75) Inventor: John J. Bowser, Newark, DE (US)

(73) Assignee: CMS Technology Holdings, Inc., Wilmington, DE (US)

( * ) Notice: Subject to any disclaimer, the term of this patent is extended or adjusted under 35 U.S.C. 154(b) by 0 days.

(21) Appl. No.: 09/375,898

(22) Filed: Aug. 17, 1999

(51) Int. Cl.[7] .................................................. B01D 61/36
(52) U.S. Cl. ........................ 210/640; 210/634; 210/644; 426/239; 426/425
(58) Field of Search ................................... 210/640, 644, 210/645, 649, 634; 426/425, 239; 95/45, 52, 54, 50; 96/6; 435/2, 325

(56) References Cited

U.S. PATENT DOCUMENTS

| | | | |
|---|---|---|---|
| 4,781,837 | 11/1988 | Lefebvre | 210/640 |
| 5,051,114 * | 9/1991 | Nemser et al. | 95/50 |
| 5,098,566 | 3/1992 | Lefebvre | 210/640 |
| 5,382,364 | 1/1995 | Bowser et al. | 210/640 |
| 5,382,365 | 1/1995 | Deblay | 210/644 |
| 5,723,639 * | 3/1998 | Datta et al. | 210/649 |
| 5,817,359 | 10/1998 | Michaels et al. | 426/425 |
| 5,824,223 | 10/1998 | Michaels et al. | 210/642 |
| 5,876,604 | 3/1999 | Nemser et al. | 210/634 |
| 5,902,747 * | 5/1999 | Nemser et al. | 435/325 |
| 5,914,154 | 6/1999 | Nemser | 427/245 |
| 5,938,928 | 8/1999 | Michaels | 210/634 |

OTHER PUBLICATIONS

Kunz, W., et al., Osmotic evaporation through macroporous hydrophobic membranes: a survey of current research and applications, Journal of Membrane Science 121 (1996) 25–36.

Mansouri, J. et al., Osmotic Distillation of oily feeds, Journal of Membrane Science 153 (1999) 103–120.

Mansouri, J. et al., Membrane Development for Processing of Oily Feeds in IMD, Workshop on Membrane Distillaition, Osmotic Distillation and Membrane Contactors, Italy, Jul. 2–4, 1998, pp. 43–46.

Hogan, P.A., et al., A New Option: Osmotic Distillation, Chemiical Engineering Progress, Jul., 1998, pp. 49–61.

* cited by examiner

Primary Examiner—Ana Fortuna
(74) Attorney, Agent, or Firm—Jeffrey C. Lew

(57) ABSTRACT

A method of raising the concentration of a liquid mixture utilizes osmotic distillation to transfer a volatile component from the mixture in contact with one side of a nonporous, preferably high free volumes, gas permeable membrane to a strip solution in contact with the other side of the membrane. Due to its nonporous nature the gas permeable membrane resists penetration and wetting by oily components that may be present in the feed mixture. Similarly, occlusion of the membrane by solids to resisted. Preferably, an amorphous copolymer of perfluoro-2,2-dimethyl-1,3-dioxole is useful for the gas permeable membrane. Osmotic distillation utilizing such high free volume, nonporous gas permeable membranes can concentrate difficult liquid mixtures such as pulpy fruit juices and especially, limonene-containing juices, for example, orange juice. The process can be operated at high flux for long durations between membrane cleanings. Additionally, less contamination of the strip solution into the feed mixture occurs to provide a high quality concentrate.

5 Claims, 5 Drawing Sheets

OSMOTIC DISTILLATION PROCESS

FIELD OF THE INVENTION

This invention relates to an osmotic distillation process for concentrating a liquid. More specifically, it relates to an osmotic distillation process in which a nonporous membrane of a high free volume polymer composition is utilized to transfer a volatile component from a liquid to be concentrated into a strip solution.

BACKGROUND AND SUMMARY OF THE INVENTION

Osmotic distillation is a type of membrane separation process in which a component of a liquid on one side of a porous or microporous membrane is transported through the membrane to another liquid on the opposite side of the membrane. It differs from other more widely recognized types of membrane separation processes, such as reverse osmosis, ultrafiltration, and pervaporation in that the membrane is not wettable by either of the two liquids, and that the volatile component passes through the membrane in a vapor state. According, the driving force for transfer of the volatile component is the difference between the vapor pressure of the volatile component over the "sending" liquid and the lower vapor pressure of the component over the "receiving" liquid.

A significant feature of osmotic distillation is that the transfer of the volatile component does not require a substantial system pressure or temperature gradient across the membrane. There fore, this process advantageously can be carried out at ambient temperatures and pressures. Such low temperature and low pressure process conditions render osmotic distillation ideal for increasing the concentration in an initially dilute liquid phase of a temperature and/or pressure sensitive component. These are materials which have limited stability to elevated temperatures and shear stresses. Such a component is one which would likely be adversely affected or destroyed if concentrated at elevated temperatures or pressures required by other processes. As a result of this important characteristic, osmotic distillation recently has gained much favorable attention in particular for the potential to concentrate liquid foodstuffs, cosmetics (e.g., fragrances), pharmaceutical products and thermally labile biological substances. An excellent survey of osmotic distillation technology is presented in Hogan, Paul A., A New Option: Osmotic Distillation, *Chemical Engineering progress*, July, 1998, pp. 49–61, which is incorporated herein by reference in its entirety.

The concentration of beverages such as fruit and juices and alcoholic beverages is a primary application for osmotic distillation. Perhaps the most notable reasons for concentrating beverages are that the concentrates do not contain large amounts of solvent and they are stable much longer than in the dilute state. The concentrates thus can be shipped less expensively for long distances and remain fresh far longer than if diluted.

Some fruit juices, especially those of citrus fruit have oils or other components that reduce the surface tension of the juice, e.g., surfactants. These oils and other surface tension reducing components are collectively referred to herein as "oils" or "oily components". For example, orange juice contains a substantial amount of dissolved limonene oils. The presence of dissolved oils in a primarily aqueous juice solution can be problematic for osmotic distillation because the oily components tend to wet the membrane surface, fill the pores and reduce or altogether block desired transmission of the volatile component, thereby preventing further concentration of the starting material. Oils may also eventually penetrate the membrane and allow the fluids on either side the membrane to mix, which is undesirable.

Fruit juices as well as other liquids can be pulpy. That is, they contain solids suspended in the liquid. As the juice concentrates, the solid concentration increases. Solids can also block substantial portions of the membrane surface so as to occlude the pores and hinder osmotic distillation to the extent that the rate of transmission of the volatile component is greatly reduced.

It would be desirable to have an osmotic distillation process for concentrating liquids that is resistant to wetting and blocking of the membrane by oily and or solid components in the process liquids. Accordingly, there is now provided according to this invention a process for concentrating a liquid feed mixture comprising the steps of:

providing a feed mixture of components present in initial concentration, the mixture comprising a volatile component which is soluble in the feed mixture and over which said volatile component has a first vapor pressure, and a strip solution over which the volatile component has a second vapor pressure different from the first vapor pressure;

providing a two sided membrane structure comprising a nonporous membrane on one side and coextensive with a microporous substrate on the second side, the nonporous membrane being of a composition which is permeable to the volatile component and not wettable by either the feed mixture of the strip solution;

contacting the feed mixture with the nonporous membrane while contacting the strip solution with the microporous substrate;

maintaining the second vapor pressure below the first vapor pressure, thereby causing the volatile component to permeate the membrane from the feed mixture to the strip solution and thus producing a concentrated liquid mixture comprising components other than the volatile component present at concentration greater than the initial concentration; and removing the concentrated liquid mixture.

There is also provided an osmotic distillation apparatus for concentrating a liquid feed mixture of components present in initial concentration, the mixture comprising a volatile component which is soluble in the feed mixture and over which said volatile component has a first vapor pressure, the apparatus comprising, a two sided membrane structure comprising a nonporous membrane of a composition permeable to the volatile component, and a microporous substrate adjacent and coextensive with the nonporous membrane, means for contacting the nonporous membrane with the feed mixture, means for contacting the microporous substrate with a strip solution comprising the volatile component which is present at a second vapor pressure different from the first vapor pressure; and means for maintaining the second vapor pressure below the first vapor pressure, thereby causing the volatile component to permeate the membrane from the feed mixture to the strip solution, in which apparatus the composition of the nonporous membrane is not wettable by either the feed mixture or the strip solution.

DETAILED DESCRIPTION

Figure 1:
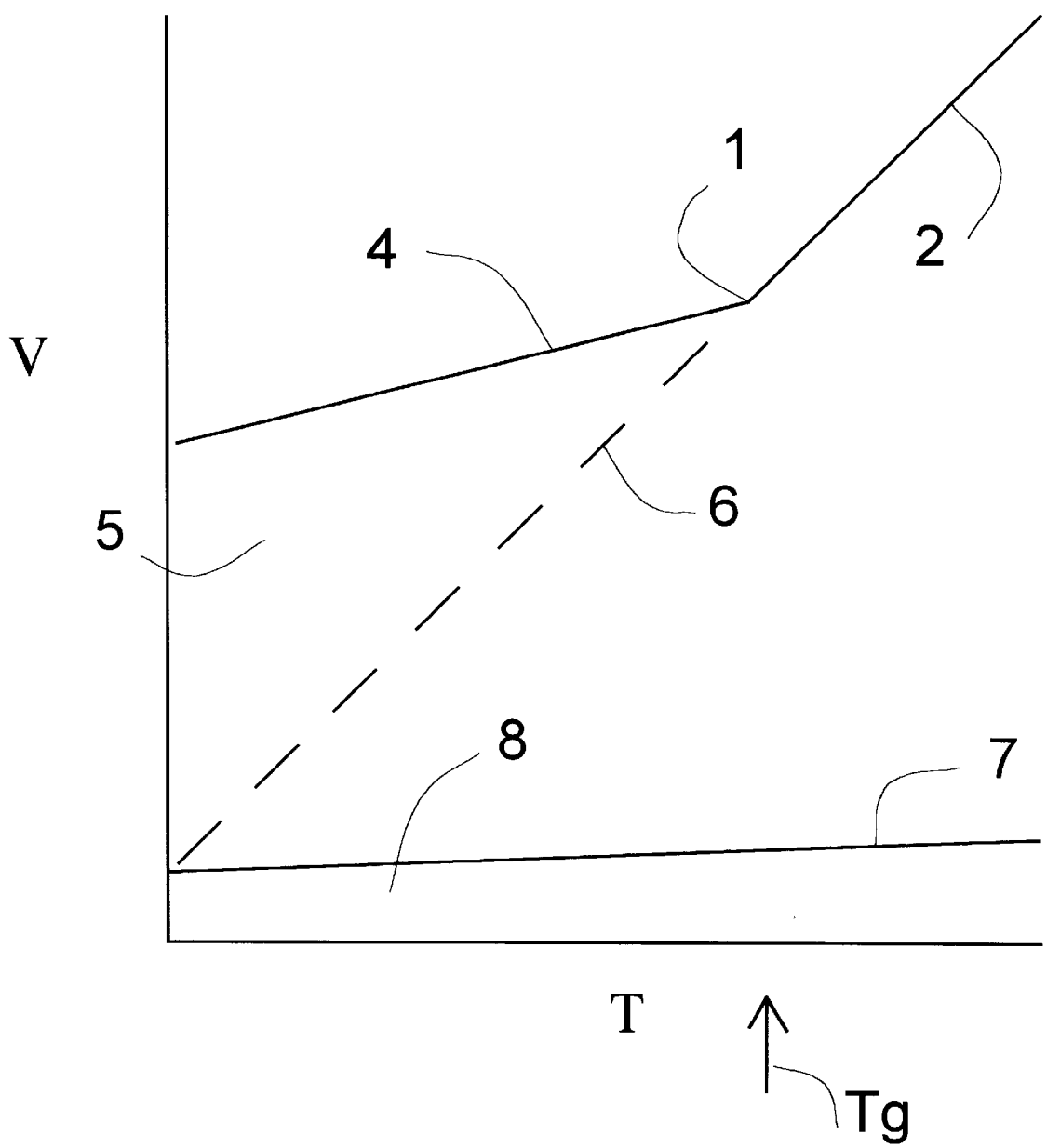
FIG. 1 is a plot of specific volume versus temperature of a polymer exhibiting excess free volume.

The novel osmotic distillation process basically calls for transferring a volatile component from a first liquid through a nonporous membrane to a second liquid, thereby concentrating the residual component which remains in the first liquid and diluting the second liquid by addition of the transferred volatile component. Often the principal product of this process is the residual-enriched first liquid rather than the diluted second liquid.

The convention has been adapted herein to refer to the first liquid, which is the liquid from which the volatile component is removed, i.e., the concentrating liquid, as the "feed" and further, to refer to the second, or liquid diluted by the volatile component, as the "strip solution". The latter term may be deemed to have been derived from its function of stripping the volatile component from the feed.

The feed is a liquid state mixture comprising at least one volatile component and at least one other component which becomes concentrated by removing some of the volatile component. Solids can be present in the feed mixture, which thus will be a slurry or suspension. The proportion of solids to liquid is not critical provided that the feed mixture remains a freely flowing fluid. When present, the solids are usually uniformly, or at least well dispersed in the feed mixture. Fruit juice with pulp, i.e., pieces of fruit, is a typical example of a solids-containing feed.

The feed mixture can have one or more residual components which are concentrated by operation of the osmotic distillation process. Reference herein to the concentrating component in singular is intended to encompass the plural unless started otherwise. The concentrating component can be a liquid or a solid. Preferably, if liquid, the concentrating component should be miscible with the volatile component. Furthermore, the vapor pressure of the concentrating component should be low compared to that of the volatile component to prevent substantial transfer of the former to the strip solution. If the concentrating component is a solid, it can be completely or partially soluble in the volatile component.

In osmotic distillation, the deriving force for transfer of the volatile component through the membrane is the gradient of the volatile component vapor pressure between the feed mixture and the strip solution. Therefore the volatile component should provide a high vapor pressure over the concentrating solution so that a large vapor pressure gradient can be obtained. The novel osmotic distillation process is well suited to concentrating initially dilute solutions of low- or non-volatile solutes of moderate to high molecular weight, such as sugars, polysaccharides, carboxylic acid salts, proteins, and the like. The solvent in many industrially important cases is frequently water or an organic solvent, typically a polar organic solvent such as an alcohol, e.g., ethyl alcohol. The actual solvent used will depend on the feed mixture to be treated. Preferably the feed mixture is selected from such composition as liquid foodstuffs, including soups and fruit, alcoholic, or caffeinated beverages, cosmetics (e.g., fragrances), pharmaceutical products, neutriceuticals, latices and thermally labile biological substances, such as animal body fluids including, blood, urine, cerebrospinal fluid, and the like.

When water is the solvent, the strip solution should be a solution of preferably a high osmotic activity, nonvolatile solute dissolved in the volatile component. That is, the nonvolatile solute should have a low equivalent weight and high solubility in the volatile component. The strip solution should be maintained at a relatively high concentration of the nonvolatile solute so as to depress the vapor pressure of the volatile component at the strip solution side of the membrane. This promotes the rapid transfer of the volatile component to the strip solution.

The vapor pressure of the volatile component in the strip solution will increase as transfer through the membrane progresses. In order to keep the transfer rate high, the volatile component concentration in the strip solution should be kept low. This can be accomplished by restocking the strip solution with virgin, low volatile component concentration strip solution. For economically attractive operation, the strip solution can be reconcentrated by removing excess volatile component and reused. Thus the nonvolatile solute preferably should be stable at high temperature which may be used to accelerate reconcentration. The strip solution can also be restocked from brine wells or bodies of water with high salt concentration. It is also desirable for the nonvolatile solvent of the strip solution to be nontoxic, noncorrosive and inexpensive. Preferably the nonvolatile strip solution solute is an alkali hydroxide, a water soluble salt selected from the group consisting of alkali halide salt, and alkaline earth metal halide salt or mixtures thereof. Representative water soluble salts include sodium chloride, calcium chloride, magnesium chloride, monopotassium phosphate, dipotassium orthophosphate, magnesium sulfate, lithium chloride, lithium bromide, lithium iodide, potassium iodide, sodium iodide and mixtures thereof.

In an important aspect, the osmotic distillation process according to this invention utilizes a membrane structure comprising a nonporous gas permeable membrane in contrast to a porous membrane that has heretofore been used in conventional osmotic distillation. This feature renders the novel process exceptionally useful to concentrate liquid mixtures which have oily components and/or suspended solids. Membrane pores can be wetted by oils in the feed mixture, especially as the mixture concentrates. When a porous membrane becomes "wetted out", i.e., saturated with the oily components, the oils can penetrate the membrane to occlude and/or coat the pores. Such occlusion diminishes transfer of the volatile component and such coating can also allow the strip solution and/or the feed mixture so "breakthrough" the membrane and thus contaminate the other. Similarly, solids in the concentrating solution can occlude the pores. It has been discovered that a nonporous membrane can retard or prevent these adverse effects so that the nonporous membrane can be utilized for a much longer time at higher transmission rate between cleanings. Hence it is preferred that the nonporous membrane of the novel osmotic distillation process be of a composition that is not wettable by either the feed or the strip solution. By "not wettable" is meant that no breakthrough results when the nonporous membrane is subjected to a breakthrough procedure described in Examples 14–16 of U.S. Pat. No. 5,876,604, the entire disclosure of which is incorporated herein by reference, using the feed or strip solution at a pressure and duration for which the osmotic distillation process is to be performed. In a broad sense, the duration of the breakthrough test typically falls within the range of 1 day to 1 month and the pressure is usually in the range of about 1–5 pounds/sq. in., "psi", (7–35 KPa). Without undue experimentation, one of ordinary skill in the art will be able to settle upon a test duration for a particular combination of liquid and membrane compositions.

Heretofore, nonporous membranes were not through suitable for use in osmotic distillation. As mentioned, in osmotic distillation transfer of the volatile component characteristically occurs by permeation of a gas through a membrane. Conventional materials for nonporous membranes generally do not have high gas permeabilities. Therefore, it has been traditionally observed in the art that transmission of a volatile component through a nonporous membrane would be too slow to make osmotic distillation practicable. It has now been found that certain materials can be formed into nonporous membranes which provide acceptable transmission rates for osmotic distillation and thus permit the benefit of reduced wetting derived from utilizing nonporous membranes in osmotic distillation to be achieved.

In an important aspect of this invention, it has been found that high free volume gas permeable membranes can produce flux of a volatile component suitable for commercially viable separation by osmotic distillation even though the membrane is nonporous. Hence, the use of a high free volume, nonporous gas permeable membrane permits a high flux, stable concentration process for concentrating liquid mixtures that had formerly been difficult to concentrate by osmotic distillation.

Free volume is a characteristic of a polymer which can be understood by inspection of a plot of specific volume V versus temperature T as seen in the FIG. 1. The term "free volume" refers to the volume of the polymer not actually occupied by the molecules. In FIG. 1, the volume of polymer occupied by the molecules is represented by region 8 below line 7 that defines the volume-temperature relationship of molecules which make up a polymeric article. Line 4 defines the volume-temperature relationship of the article formed of the polymer. Therefore, the region between line 4 and line 7 represents the space between molecules within the physical dimensions of the polymeric article. Further, the region above line 4 represents the volume of space outside the bounds of the article. This uppermost region would include the volume of the pores throughout a porous article of polymer.

For many substances, the plot of V vs. T defines a linear relationship 4. However, for certain polymers, a discontinuity 1 in the V-T plot is seen at the glass transition temperature, Tg. That is, below the Tg, where the polymer is glassy, specific volume increases linearly with increasing temperature along line 4. When the glass transition temperature is reached and exceeded, specific volume continues to increase linearly with temperature along line 2, however, the rate of increase is higher. That is, the slope of the specific volume vs. temperature line 2 above the Tg, is steeper than line 4 below the Tg. At any temperature below the Tg, one can determine the difference between the actual specific volume and the expected specific volume obtained by extrapolating the specific volume vs. temperature line 6 from above the Tg to below the Tg. This difference, shown as region 5 is designated the "excess free volume". Thus glassy polymers at temperatures below the Tg can have a large excess free volume which provides an overall free volume greater than the expected free volume between lines 6 and 7 that is especially high.

High free volume polymers are preferred for use as nonporous membranes for osmotic distillation. By the term "high free volume" is meant that the free volume of the polymer at the temperature of use is at least about 15% and preferably at least about 28%. The temperature of use will be the temperature at which osmotic distillation is performed. It is desirable for the high free volume polymer to have a glass transition temperature above normal room temperature, preferably above about 30° C., and more preferably above about 115° C.

High free volume polymers which are particularly preferred for carrying out osmotic distillation are polytrimethylsilylpropyne, silicone rubber, and certain amorphous copolymers of perfluoro-2,2-dimethyl-1,3-dioxole, the latter being especially favored.

The membrane can be formed from an amorphous copolymer of a certain perfluorinated dioxole monomer, namely perfluoro-2,2-dimethyl-1,3-dioxole ("PDD"). In some preferred embodiments, the copolymer is copolymerized PDD and at least one monomer selected from the group consisting of tetrafluoroethylene ("TFE"). perfluoromethyl vinyl ether, vinylidene fluoride and chlorotrifluoroethylene. In other preferred embodiments, the copolymer is a dipolymer of PDD and a complementary amount of TFE, especially such a polymer containing 50–95 mole % of PDD. Examples of dipolymers are described in further detail in U.S. Pat. No. 4,754,009 of E. N. Squire, which issued on Jun. 28, 1988; and 4,530,569 of E. N. Squire, which issued on Jul. 23, 1985. Perfluorinated dioxole monomers are disclosed in U.S. Pat. No. 4,565,855 of B. C. Anderson, D. C. England and P. R. Resnick, which issued Jan. 21, 1986. The disclosures of all of these U.S. patents are hereby incorporated herein by reference.

The amorphous copolymer can be characterized by its glass transition temperature which will depend on the component of the specific copolymer of the membrane, especially the amount of TFE or other comonomer that may be present. Examples of Tg are shown in FIG. 1 of the aforementioned U.S. Pat. No. 4,754,09 of E. N. Squire as ranging from about 260° C. for dipolymers with 15% tetrafluoroethylene comonomer down to less than 100° C. for the dipolymers containing at least 60 mole % tetrafluoroethylene. It can be readily appreciated that perfluoro-2,2-dimethyl-1,3-dioxole copolymers according to this invention can be tailored to provide sufficiently high Tg that a membrane of such component can withstand exposure to steam temperatures. Hence, membranes of this invention can be made steam sterilizable and thereby suitable for various uses requiring sterile materials, especially those involving biological materials.

To achieve optimum osmotic distillation performance, it is desirable to determine that the gas permeable membrane is nonporous. Absence of porosity can be measured by various methods known in the art, including for example, microscopic inspection of the membrane surface. PDD copolymers are particularly advantageous in this regard because they are intrinsically selectively gas permeable. Specifically, nonporous membranes of PDD copolymers exhibit an oxygen/nitrogen gas selectivity of greater than about 1.4. Hence it is possible to measure the difference in flux rates of two gases, for example oxygen and nitrogen, through a PDD copolymer membrane to verify that it is selectively gas permeable, and therefore, intact and nonporous over the membrane surface.

The nonporous membrane can be an unsupported monolithic gas permeable membrane structure. Preferably, a multiplayer composite of a nonporous gas permeable layer supported on a porous or microporous substrate layer is utilized in which the nonporous membrane is adjacent and coextensive with the supporting porous substrate. The porous support provides structural integrity for the nonporous membrane. Any porous substrate material which is not wettable by the strip solution and that offers such support is suitable provided that it also is not degraded by the feed mixture, the volatile component or the strip solution and does not impede the transmission of the volatile component through the nonporous membrane. Additionally, materials that are by themselves wettable by the strip solution or feed can be treated to be made not wettable. Examples of such materials and methods of rendering them not wettable to liquids is found in U.S. Pat. Nos. 5,116,650 and 5,156,780 the disclosures of which are hereby incorporated herein by reference. Representative porous substrate materials include polyolefins, such as polyethylene and polypropylene, polytetrafluoroethylene, polysulfone, and polyvinylidene fluoride.

The shape of the membrane can be in a diverse variety of forms and typically can be in sheet form, such as a perforated sheet; porous woven or nonwoven fabric; microporous polymer film. The sheet can be deployed as a flat sheet, or the sheet can be pleated or rolled into a spiral to increase the surface to volume ratio of the separation unit. The membrane can also be in tube or tube ribbon form. Membrane tubs and tube ribbons are disclosed in U.S. Pat. No. 5,565,166 which is incorporated herein by reference.

In a particularly preferred embodiment, the nonporous gas permeable membrane for use in osmotic distillation is applied as a thin layer on a support of a microporous hollow fiber. Such composite hollow fibers beneficially provide a very large surface area per unit of membrane structure volume and thus are able to produce extremely high gas flux in small occupied space. This surface to volume ratio benefit can be exploited further by assembling a plurality of composite hollow fibers in a so-called fiber module. Such modulate typically includes a bundle of many hollow fibers in substantially parallel alignment. The ends of the fibers are potted in a fixation medium, for example an epoxy resin. The bundle is then sliced through the potted ends and the bundles can be mounted within a casing to form a shell and tube modular unit. Although the nonporous membrane can be formed on the hollow fibers before bundling and assembling the module, it is preferred to form the membrane on the hollow fibers after installing them within a module. U.S. Pat. No. 5,914,154 of Stuart M. Nemser, the disclosure of which is incorporated herein by reference in tis entirety, discloses especially effective methods to produce such composite hollow fiber modules.

This invention is now illustrated by examples of certain representative embodiments thereof, wherein all parts, proportions and percentages are by weight unless otherwise indicated. All units of weight and measure not originally obtained in SI units have been converted to SI units.

EXAMPLES

Comparative Example 1 and Examples 1–3

Figure 2:
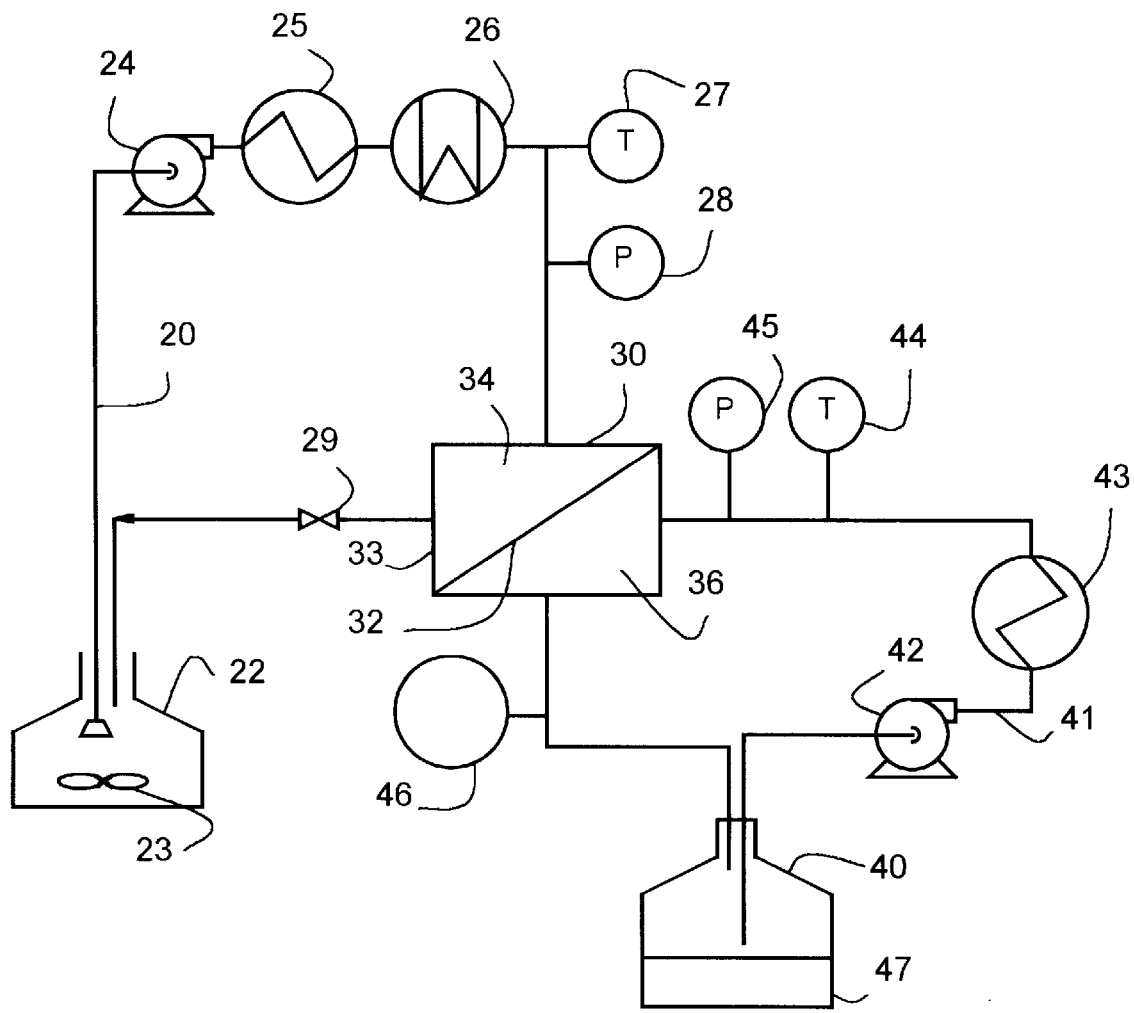
FIG. 2 is a schematic diagram of an apparatus utilized to practice osmotic distillation according to an embodiment of this invention.

An osmotic distillation apparatus was set up as shown in FIG. 2. Calcium chloride strip solution in water was circulated in brine loop 20 from brine feed tank 22 through a membrane module 30 via a Cole-Parmer Model 7144-05 variable speed, brine feed pump 24. The brine feed tank was equipped with a magnetic stirrer 23 to maintain a homogeneous solution concentration in the tank. The brine was pumped through a heat exchanger in a VWR model 1140 constant temperature bath 25 maintained at 25° C. and an Avecor Affinity™ blood oxygenator (Medtronic, Inc., Minneapolis, Minn.) 26 to remove excess gases in the strip solution. The latter step was accomplished by passing the strip solution through the side of the oxygenator which normally receives blood while drawing about 25 inches Hg vacuum gauge on the side of the oxygenator which normally receives gas with a Welch Duo-Seal™ model 1400 vacuum pump. Temperature of the circulating strip solution was measured at thermocouple 27 prior to entry into membrane module 30. Pressure of the circulating strip solution at pressure gauge 28 was controlled by manually throttling valve 29 at return of the solution to the feed tank.

The feed was circulated in a feed loop 41 from supply tank 40 through the membrane module 30 via another Cole-Parmer Model 7144-05 pump 42 and a second heat exchanger in the same VWR model 1140 constant temperature bath 43. Temperature 44 and pressure 45 were monitored prior to entry into the module. In all examples, brine and feed temperatures entering the module were kept within a narrow range of each other that did not exceed about 2° C. and was typically about 0.5° C. Conductance of the feed was continuously measured by a Yellow Springs Instrument Model 32 conductance meter 46. Hence, a breakthrough of electrically conductive strip solution could be detected by an increase in conductivity of the feed. Mass of the concentrating solution in the supply tank was determine from mass balance calculations based on weight measurements taken using an Acculab® Model V-4800 electronic balance (0.1 g sensitivity) 47 placed under the supply tank. Flow of the feed stream entering the feed tank provided agitation.

The membrane module 30 also was a Avecor Affinity™ blood oxygenator. This unit contained within a cylindrical case 33 multiple, microporous, polypropylene hollow fibers with a total of about 25 square feet of membrane transfer area which are collectively represented by schematic element 32. Pore size was believed to be about 0.04 $\mu$m and the hollow fibers had a bore diameter of about 230 $\mu$m and an outer diameter of about 300 $\mu$m. The apparatus was configured to direct the strip solution through the fiber bores and feed over the outer surface of the fibers to so as to pass these fluids through separate zones 34 and 36 on opposite sides of the membrane while in the module.

In operation, solid calcium chloride was added intermittently to the brine feed tank as needed to maintain solid salt present in the tank and thus to keep the concentration of strip solution at or near saturation. Pressure of the strip solution was controlled to at least 0.5 pounds/sq. in. "psi", (3.5 KPa) greater than the feed stream. This was done to assure that any breach of the membrane would cause bulk strip solution to contaminate the feed which then could be detected by conductivity as mentioned earlier.

Osmotic distillation was conducted using four membranes alternately. The stock oxygenator module with uncoated microporous polypropylene hollow fibers was used in Comparative Example 1. In Examples 1–3, an identical type of oxygenator module was used in which the hollow fibers were overlaid with different thicknesses of a nonporous layer of a perfluoro-2,2-dimethyl-1,3-dioxole ("PDD")/ tetrafluoroethylene copolymer (Teflon® AF 2400, E. I. du Pont de Nemours & Co.) applied to the outside of the fibers according to the method disclosed in U.S. Pat. No. 5,914,154, the disclosure of which is incorporated herein by reference. The effective membrane thicknesses on the fibers was 1.3 $\mu$m, 2.5 $\mu$m and 3.7 $\mu$m respectively for Exs. 1–3, Membrane thickness was calculated from gas permeability measurements.

Rates of water vapor transmission from feed to strip solution obtained by osmotic distillation for each of two feeds, distilled water and 10 wt./wt. % sucrose in water are summarized in Table I. Circulation rates were 7.8 cm²/s and 38 cm²/s for strip solution and feed stream, respectively. During each procedure no change of feed stream conductivity was detected indicating that bulk strip solution did not break through to contaminate the feed stream.

TABLE 1

|  | Coating Thickness $\mu m$ | Water Water vapor flux $L/(m^2 \cdot h)$ | Sucrose Sol'n. Water vapor flux $L/(m^2 \cdot h)$ |
| --- | --- | --- | --- |
| Comp. Ex. 1 | 0 | 0.241 | 0.335 |
| Ex. 1 | 1.3 | 0.144 | 0.149 |
| Ex. 2 | 2.5 | 0.138 | 0.129 |
| Ex. 3 | 3.7 | 0.074 | 0.078 |

These examples show that osmotic distillation can be carried out according to the present invention with only slight reduction of water vapor flux compared to an uncoated, microporous membrane structure.

Example 4 and Comparative Example 2

The osmotic distillation procedure of Example 1 was repeated except that the feed stream consisted of 20 ml r-limonene added to 4 liters of 10 wt./wt % sucrose solution in water (Ex. 4). For comparison, this procedure was also repeated using the membrane module of Comparative Example 1 (Comp. Ex. 2).

Figure 3:
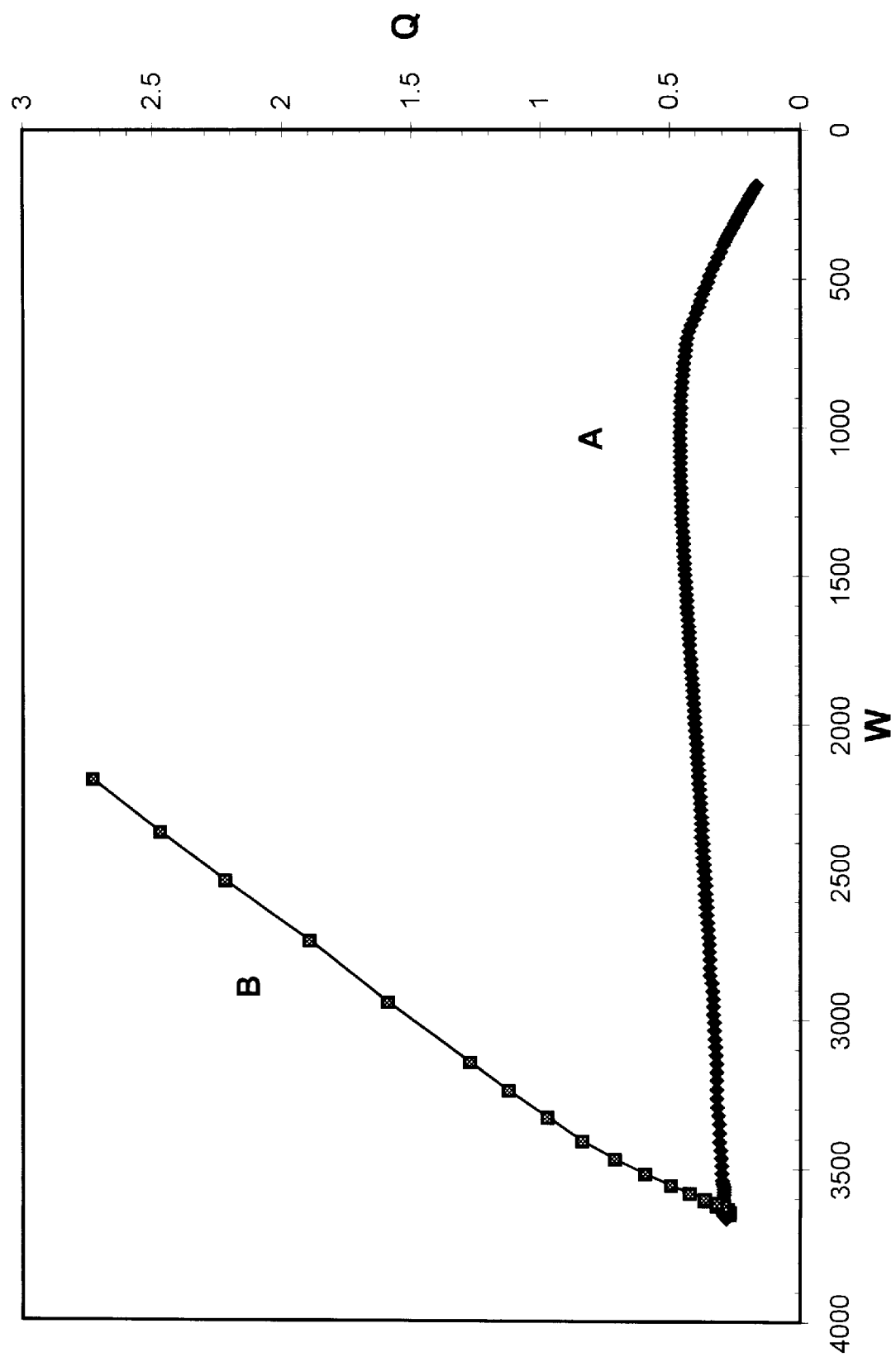
FIG. 3 is a plot of conductivity in millisiemens vs. weight of feed tank contents in grams during osmotic distillations to concentrate limonene-containing sucrose solution.

FIG. 3 shows a plot of conductivity, Q, in millisiemens vs. weight of feed tank contents, W, in grams for Ex. 4 (data "A") and Comp. Ex. 2 (data "B"). In the case of the nonporous membrane coated fibers, the figure reveals that conductivity increased only slightly then gradually declined as mass of feed in the feed tank declined due to water vapor transferred to the strip solution. This is behavior expected during normal concentration by osmotic distillation of a slightly conductive solution such as sucrose. In contrast, data B in the figure shows conductivity rose rapidly which indicates contamination of the feed stream by the brine. Comp. Ex. 2 was terminated while a substantial amount of feed remained in the supply tank because of the significant amount of mixing of strip solution in the feed stream.

Figure 4:
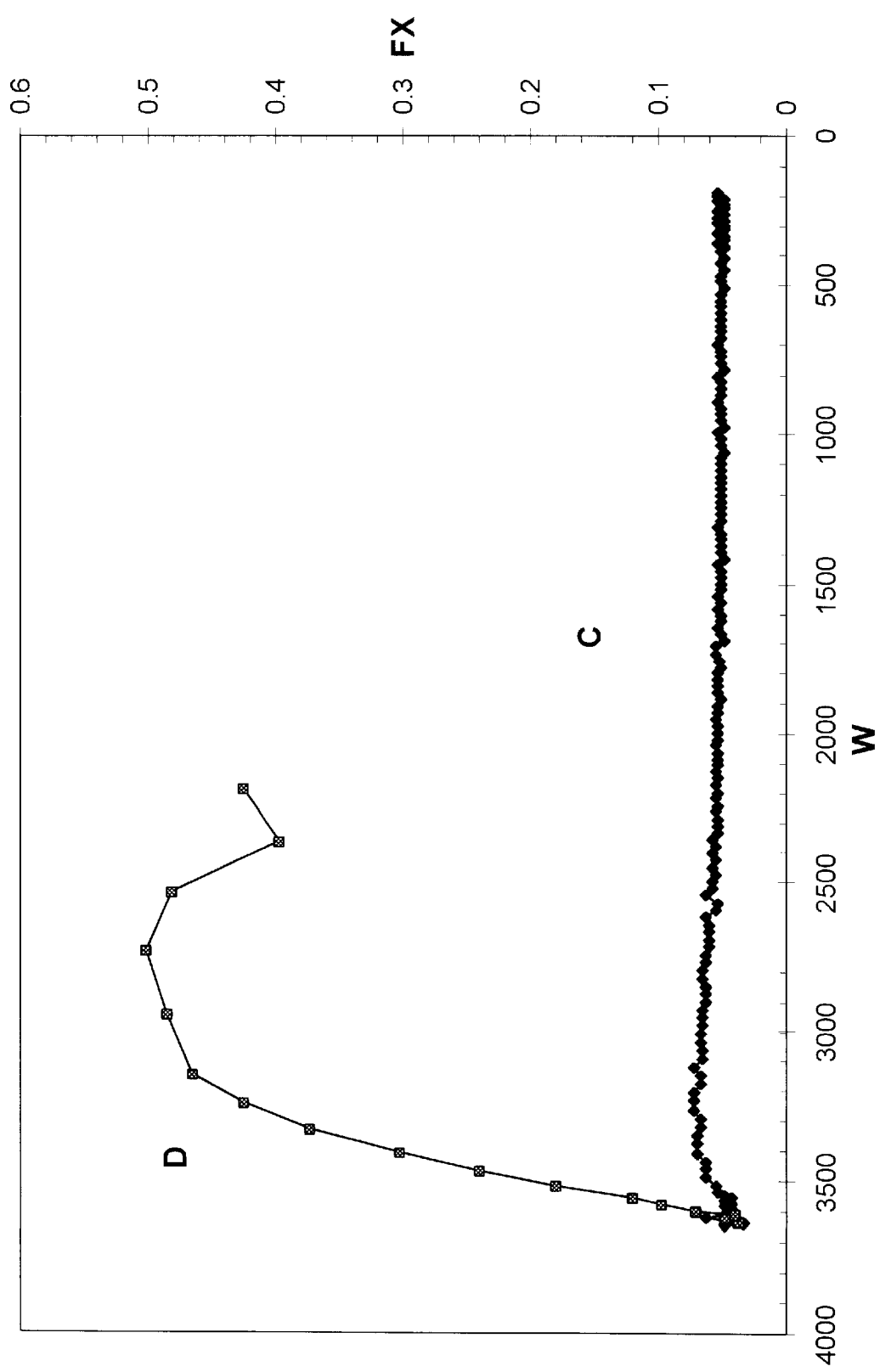
FIG. 4 is a plot of transmembrane flux during osmotic distillatinos to concentrate limonene-containing sucrose solution.

Data "C" (Ex. 4) and "D" (Comp. Ex. 2) of FIG. 4 show the rate of flow, FX, in $L/(m^3 \cdot h)$ across the membranes during osmotic distillation as calculated from weight loss of supply tank inventory. The nearly steady flux of Ex. 4 is probative of water vapor transmission occurring as a result of normal osmotic distillation. In contrast, the large and erratic flux of Comp. Ex. 2 is indicative of liquid water transport through the membrane that is inconsistent with osmotic distillation.

The comparative example thus shows that the low initial concentration of r-limonene oil present in the feed adversely affected the hydrophobicity of the microporous hollow fiber allowing liquid water to transport through the membrane and cross contaminate the strip solution and feed. However, Example 4 demonstrates that the existence of a nonporous membrane on the microporous polypropylene fibers prevented the r-limonene oil from "wetting out" the membrane so that effective osmotic distillation could be carried out to concentrate the feed. Limonene is a naturally occurring oil in many fruit juices, particularly citrus juices. Hence, these examples indicates that coated membranes can be useful in osmotic distillation processes for concentrating fruit juices containing oily components that wet out porous membranes and render conventional osmotic distillation systems inoperable after a very short time.

Example 5

The apparatus and procedures of Example 2 were repeated with the following differences. Four thousand grams of freshly brewed coffee was circulated through the feed stream circulation loop and supply tank to fill the system. Initial inventory in the supply tank was 3586 grams, implying that the balance of 414 grams was resident in the circulation loop volume. Osmotic distillation was performed until the brewed coffee concentrated to a residue mass of 295 grams in the supply tank.

Figure 5:
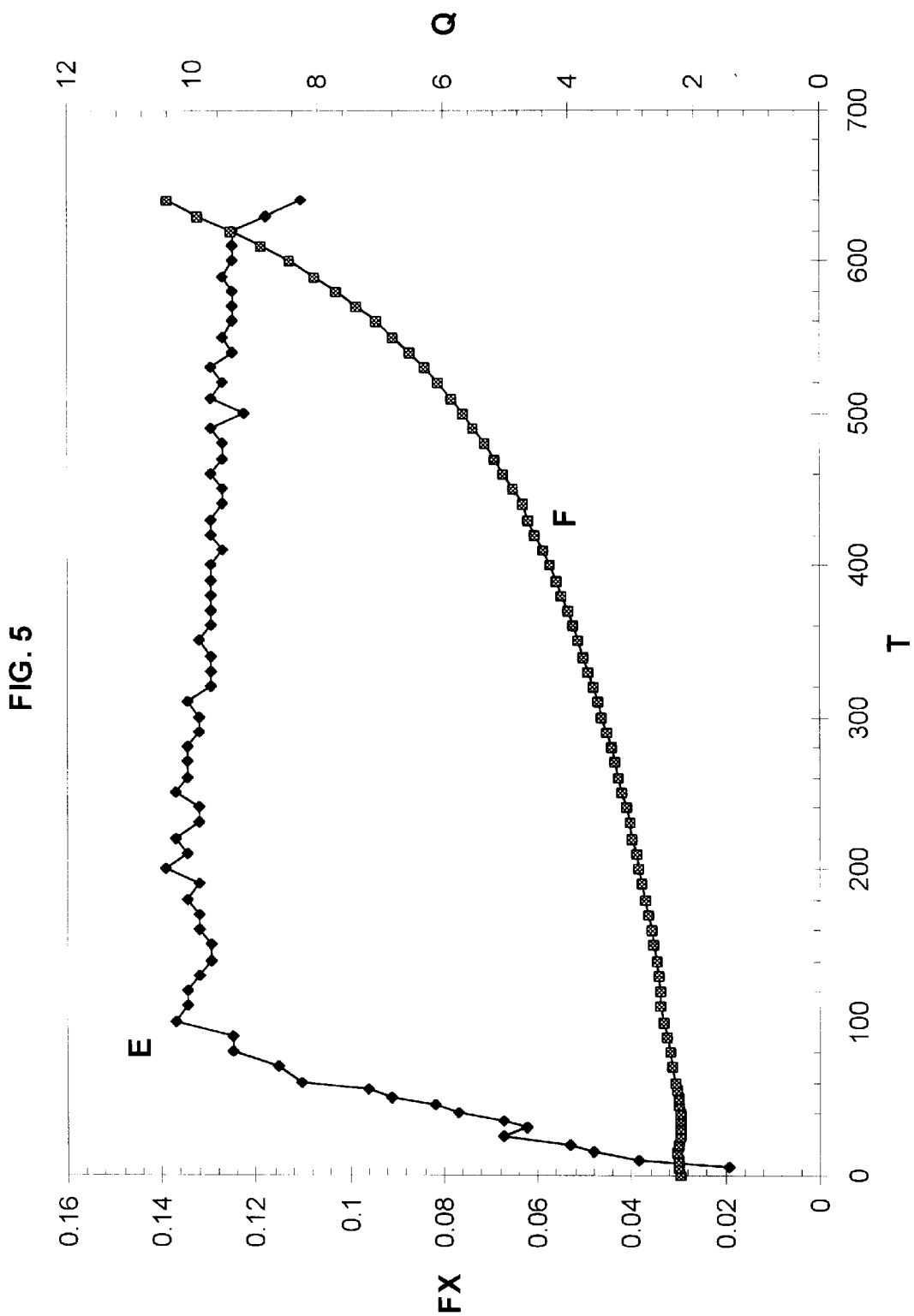
FIG. 5 is a plot of transmembrane water vapor flux and conductivity of the feed stream during osmotic distillation of coffee according to an embodiment of this invention.

FIG. 5 is a plot of water vapor flux (data "E") through the membrane calculated from weight loss in the supply tank and conductivity (data "f") of the feed stream as a function of time during osmotic distillation. Water vapor flux rose rapidly to a steady state rate at about 90 minutes then decreased very gradually until about 10 hours of distillation when the transmission rate began to drop precipitously. At the end of the procedure, the level of inventory in the feed tank dropped very close to the feed loop intake. This caused air to be entrained into the feed and is believed to have caused the flux drop seen in the last two recorded points. Because coffee contains electrolytes, conductivity would be expected to rise as the feed because more concentrated. This is seen in FIG. 5 which confirms that osmotic distillation was effectively carried out with the nonporous membrane coated microporous hollow fiber substrate.

Although specific forms of the invention have been selected for illustration in the drawings and the preceding description is drawn in specific terms for the purpose of describing these forms of the invention fully and amply for one of average skill in the pertinent art, it should be understood that various substitutions and modifications which bring about substantially equivalent or superior results and/or performance are deemed to be within the scope and spirit of the following claims.

What is claimed is:

1. A process for concentrating a liquid feed mixture comprising the steps of providing a feed m mixture of components present in initial concentration, the mixture comprising a volatile component in which mixture said volatile component is soluble and over which mixture said volatile component has a first vapor pressure, and a strip solution over which the volatile component has a second vapor pressure different from the first vapor pressure;

providing a two sided membrane structure comprising a nonporous membrane on one side and conextensive with a microporous substrate on the second side, the nonporous membrane comprising a polymer composition having a free volume of at least one about 15% and being of a composition which is permeable to the volatile component and not wettable by either the feed mixture or the strip solution;

contacting the feed mixture with the nonporous membrane while contacting the strip solution with the microporous substrate;

maintaining the second vapor pressure below the first vapor pressure, thereby causing the volatile component to permeate the membrane from the feed mixture to the strip solution and thus producing a concentrated liquid mixture comprising components other than the volatile component present at concentration greater than the initial concentration; and removing the concentrated liquid mixture in which the feed mixture comprises a temperature sensitive fruit juice selected from the group consisting of orange juice, grape juice, pineapple juice, apple juice, pear juice, cranberry juice and mixtures thereof.

2. The process of claim 1 in which the fruit juice is orange juice.

3. A process for concentrating a liquid feed mixture comprising the steps of providing a feed mixture of components present in initial concentration, the mixture comprising a volatile component in which mixture said volatile component is soluble and over which mixture said volatile component has a first vapor pressure, and a strip solution over which the volatile component has a second vapor pressure different from the first vapor pressure;

providing a two sided membrane structure comprising a nonporous membrane on one side and coextensive with a microporous substrate on the second side, the nonporous membrane comprising a polymer composition having a free volume of at least about 15% and being of a composition which is permeable to the volatile component and not wettable by either the feed mixture or the strip solution;

contacting the feed mixture with the nonporous membrane while contacting the strip solution with the microporous substrate;

maintaining the second vapor pressure below the first vapor pressure, thereby causing the volatile component to permeate the membrane from the feed mixture to the strip solution and thus producing a concentrated liquid mixture comprising components other than the volatile component present at concentration greater than the initial concentration; and removing the concentrated liquid mixture, in which the feed mixture comprises coffee.

4. A process for concentrating a liquid feed mixture comprising the steps of providing a feed mixture of components present in initial concentration,, the mixture comprising a volatile component in which mixture said volatile component is soluble and over which mixture said volatile component has a first vapor pressure, and a strip solution over which the volatile component has a second vapor pressure different from the first vapor pressure;

providing a two sided membrane structure comprising a nonporous membrane on one side and coextensive with a microporous substrate on the second side, the nonporous membrane comprising a polymer composition having a free volume of at least about 15% and being of a composition which is permeable to the volatile component and not wettable by either the feed mixture or the strip solution;

contacting the feed mixture with the nonporous membrane while contacting the strip solution with the microporous substrate;

maintaining the second vapor pressure below the first vapor pressure, thereby causing the volatile component to permeate the membrane from the feed mixture to the strip solution and thus producing a concentrated liquid mixture comprising components other than the volatile component present at concentration greater than the initial concentration; and removing the concentrated liquid mixture, in which the strip solution comprises a component selected from the group consisting of alkaline halide salt, alkaline earth metal halide salt, alkali hydroxide, and mixture thereof.

5. The process of claim 4 in which the salt is selected from the group consisting of sodium chloride, calcium chloride, magnesium chloride, monopotassium phosphate, dipotassium orthophosphate, magnesium sulfate, lithium chloride, lithium bromide, lithium iodide, potassium iodide, sodium iodide and mixture thereof.

* * * * *

UNITED STATES PATENT AND TRADEMARK OFFICE
CERTIFICATE OF CORRECTION

PATENT NO. : 6,299,777 B1
DATED : October 9, 2001
INVENTOR(S) : John J. Bowser

It is certified that error appears in the above-identified patent and that said Letters Patent is hereby corrected as shown below:

<u>Column 10,</u>
Line 45, delete "m" between "feed" and "mixture".
Line 56, delete "one" after "least".

<u>Column 12,</u>
Line 31, delete "alkaline halide salt," and substitute -- alkali alkali halide salt, -- therefor.
Lines 32 and 39, delete "mixture" and substitute -- mixtures -- therefor.

Signed and Sealed this

Twentieth Day of August, 2002

Attest:

JAMES E. ROGAN
Attesting Officer    Director of the United States Patent and Trademark Office

UNITED STATES PATENT AND TRADEMARK OFFICE
CERTIFICATE OF CORRECTION

| | |
|---|---|
| PATENT NO. | : 6,299,777 B1 |
| APPLICATION NO. | : 09/375898 |
| DATED | : October 9, 2001 |
| INVENTOR(S) | : John Bowser |

It is certified that error appears in the above-identified patent and that said Letters Patent is hereby corrected as shown below:

In the Specification

In column 1, at line 2, immediately above "FIELD OF THE INVENTION", insert the following paragraph:

-- Support was provided under National Science Foundation award 9960675. The U.S. government has rights in this patent application. --

Signed and Sealed this
Twenty-fifth Day of August, 2015

Michelle K. Lee
*Director of the United States Patent and Trademark Office*